Aug. 8, 1950     B. M. ANGELL     2,517,823
ADJUSTABLE CARGO BULKHEAD
Filed Sept. 25, 1947
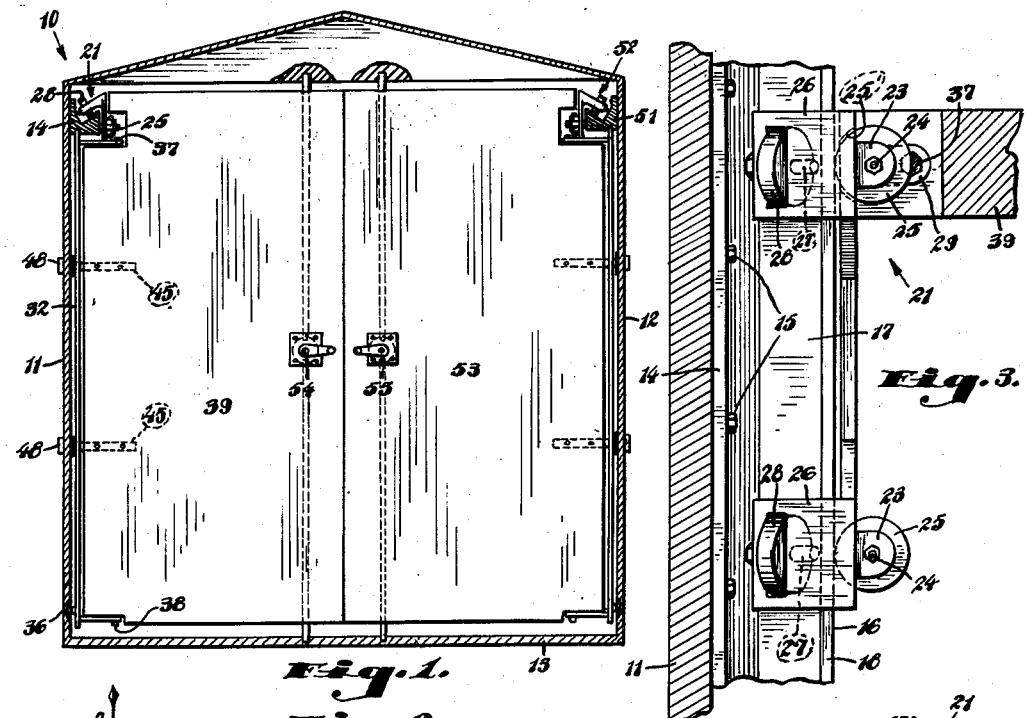
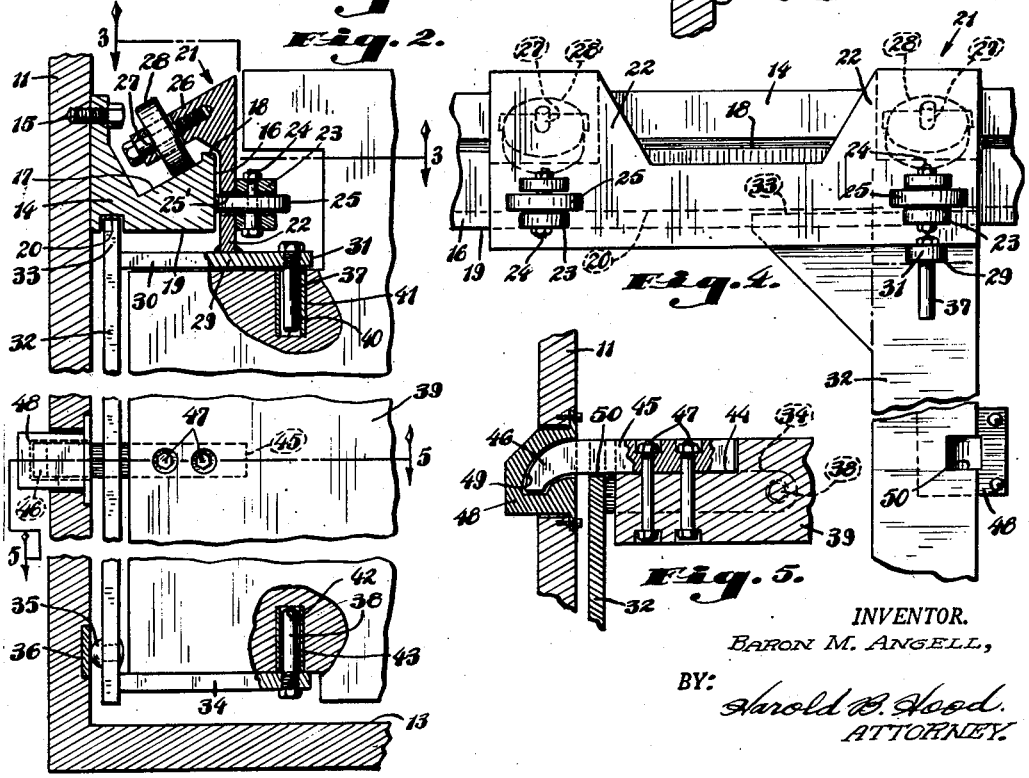
INVENTOR.
BARON M. ANGELL,
BY: Harold B. Hood.
ATTORNEY.

Patented Aug. 8, 1950

2,517,823

UNITED STATES PATENT OFFICE 2,517,823

ADJUSTABLE CARGO BULKHEAD

Baron M. Angell, Indianapolis, Ind.

Application September 25, 1947, Serial No. 775,982

10 Claims. (Cl. 105—376)

The present invention relates to bulkheads for use in, and in connection with, cargo-carrying vehicles such as freight cars, trucks, vessels, and aircraft. The primary object of the invention is to provide improved means, adapted to be mounted within the body of such a vehicle, and to act, in any one of a plurality of selective positions, as a bulkhead or dividing partition. The present invention is an improvement upon the structure disclosed in my prior Patent 2,155,463, issued April 25, 1939, and the structure herein disclosed is intended to overcome functionally objectionable features found to have been present in the structure of my said prior patent.

A specific object of the present invention is to eliminate the necessity for the provision of means, set in the floor of the vehicle body, to provide a pivotal support for the bottom edge of the swinging bulkhead element. A further object of the invention is to improve the character of the trackway upon which the bulkhead is suspended to enable said trackway more effectively to sustain the stresses to which it is subjected in the operation and use of the bulkhead. A further object of the invention is to provide improved means for holding the bulkhead in a selected body-dividing position, and to eliminate the necessity for providing a retractable bolt means carried by the door for cooperation with the adjacent wall of the vehicle body. Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a transverse section through a vehicle body, showing my improved bulkhead means in body-dividing position;

Fig. 2 is a fragmental view, upon an enlarged scale, of the door-suspending means incorporating my invention;

Fig. 3 is a fragmental horizontal section taken substantially in the planes indicated by the line 3—3 of Fig. 2;

Fig. 4 is a fragmental side elevation taken on a plane perpendicular to the plane of Fig. 2, with the door or bulkhead omitted; and Fig. 5 is a horizontal section taken substantially on the line 5—5 of Fig. 2.

Referring more particularly to the drawings, it will be seen that I have indicated more or less diagrammatically a vehicle body 10 comprising side walls 11 and 12 and a floor 13. Near the top of one side wall 11, and preferably extending longitudinally of the vehicle substantially from end to end thereof is a trackway 14, suitably secured to the wall 11 as by lag screws 15, or other equivalent fastening means. The trackway 14 is formed to provide a continuous surface 16 substantially parallel with the wall 11, and facing away from said wall; and, in a region between the surface 16 and the wall 11, with a second continuous surface 17 inclined upwardly and away from said wall, said surface 17 facing generally upwardly. A curb 18 is located between the surfaces 16 and 17 to perform a function which will later become apparent.

The trackway 14 further provides a downwardly facing continuous surface 19 extending from the base of the surface 16 to the wall 11 but interrupted, adjacent said wall, by a downwardly opening groove 20 which is continuous from end to end of the trackway.

A carriage, indicated generally by the reference numeral 21, is suspended solely upon the trackway 14. The carriage comprises an upright 22 adapted to lie closely adjacent, and substantially parallel with, the trackway surface 16. The upright 22 supports a pair of longitudinally spaced brackets 23, 23 in each of which is mounted an axle 24 providing a journal support for a roller 25 projecting through a slot 25' and into peripheral engagement with the trackway surface 16. At the upper end of the upright 22 I provide two spaced projections 26, 26, each overhanging the surface 17 and supporting an axle 27 upon which is journal mounted a roller 28. The axles 27, 27 are substantially parallel with the surface 17, and the rollers 28, 28 are peripherally engaged with the surface 17.

It will be seen that the provision of the angularly related surfaces 16 and 17 with the rollers 25 and 28 mounted upon angularly related axes, establishes a support admirably adapted to sustain gravitational forces tending to produce clockwise rotation of the carriage 21 about an axis perpendicular to the paper in Fig. 2. It will be apparent that the curb 18 aids in guarding against any possibility of either roller 28 leaving the surface 17.

Suspended from the lower end of the upright 22 is a substantially horizontal strap 29 whose opposite arms 30 and 31 project from said upright, respectively, toward and away from the wall 11. At its end adjacent the wall 11 the arm 30 supports a hanger 32 whose upper end 33 is elongated and engaged in the groove 20 of the trackway 14 to aid in guiding movement of the carriage along the trackway. The hanger 32 extends downwardly, in substantial parallelism with the wall 11, substantially to the level of the floor 13, and there carries a horizontal strap member 34 similar to the strap 29. Preferably, the hanger 32 will carry, adjacent its lower end, one or more rounded metallic buttons 35 adapted to engage a metallic strip 36 set into, or secured to, the wall 11, to aid in sustaining the tendency of the assemblage to rotate in a clockwise direction about the trackway 14. The hemispherical shape of the buttons 35 of course tends to reduce frictional resistance to movement of such buttons longitudinally of the strip 36.

The arm 31 of the strap 29 supports a substantially vertically arranged hinge pivot 37; and the arm 34 supports a similar hinge pivot 38 axially aligned with the pivot 37. A door or bulkhead 39 is provided with a socket 40 in an upwardly facing edge, preferably receiving a bushing 41 sleeved on the pivot 37, and with a socket 42 in a downwardly facing edge receiving a bushing 43 sleeved on the pivot 38. Quite obviously, this arrangement provides a pivotal support for the door 39 upon the carriage 21.

At one or more vertically spaced points, that surface of the door which faces in a door closing direction is socketed, as at 44, to receive a lug 45 whose end adjacent the wall 11 projects beyond the corresponding edge of the door and is curved, as at 46, about an axis parallel with the axis of the hinge pivots 37 and 38 but spaced from said axis in the direction of the wall 11. Bolts 47, or other equivalent fastening means, will hold the lugs 45 in position upon the door.

At points suitably spaced longitudinally of the wall 11 I set into said wall a plurality of retainer elements 48, each of which is provided with a socket 49 curved to correspond to the shape of the lug end 46, and having a mouth opening inwardly and flush with the inner surface of the wall 11. The hanger 32 is notched, as at 50, to accommodate each lug 45.

When the lug end 46 is engaged in the socket 49, it will be clear that the hanger 32 cannot be moved in either direction along the trackway so long as the door remains in closed position. The hanger is positively held against movement in an upward direction, as viewed in Fig. 5, and can be moved in a downward direction only if such movement is accompanied by clockwise rotation of the door 39 about the axis of the hinge pivots 37 and 38. Closure of the door can occur only by bringing the extremity of the lug end 46 into registry with the mouth of the socket 49, and then swinging the door in a counter-clockwise direction, as viewed in Fig. 5, while simultaneously moving the entire assemblage upwardly, as viewed in said figure, until the lug end is fully seated in the socket 49.

I prefer so to proportion the door 39 that its inner edge, when in closed position, will lie in the median plane of the vehicle body, and to provide a mating assemblage on the other side of the vehicle. Thus, I have shown a trackway 51 supported at the upper end of the wall 12 and a carriage 52 suspended upon said trackway and carrying a door 53. Since the parts of the assemblage comprising the trackway 51, carriage 52, and door 53 are identical with, but allochirally related to, the parts of the assemblage just described in detail, individual description thereof is considered to be unnecessary.

I have indicated locking means 54 and 55 for the doors 39 and 53, respectively; but since such locking means constitutes no part of the present invention, I have not illustrated it in detail. Such locking means may comprise mechanism associated with each door and engageable with the other door, or it may comprise means carried by each door and engageable with cooperating means associated with the roof and/or with the floor of the vehicle body, as in my prior Patent 2,155,463. In either case, the locking means must be of such character as to prevent, when engaged, swinging movement of either door accompanied by bodily movement of the door and carriage longitudinally of its trackway.

I claim as my invention:

1. In a vehicle having a body, a trackway carried adjacent the top of a substantially vertical wall of said body, a carriage movably supported solely upon said trackway and comprising an upright portion substantially coextensive with said wall and located adjacent said wall, an upper bracket means projecting away from said wall, and a lower bracket means projecting away from said wall, an upper hinge pivot carried by said upper bracket means, and a lower hinge pivot aligned with said upper pivot and carried by said lower bracket means, and a door swingably supported on said hinge pivots.

2. The structure of claim 1 in which said upper pivot is closely adjacent the level of said trackway and said lower pivot is closely adjacent the floor of said body.

3. In a vehicle having a body, a trackway carried adjacent the top of a wall of said body, a carriage movably supported solely upon said trackway and providing an upper hinge pivot near the top of said wall and a lower hinge pivot near the bottom of said wall and vertically aligned with said upper hinge pivot, and a door swingably supported on said hinge pivots, said trackway providing a surface inclined upwardly and away from said body wall and a second surface facing away from said body wall and substantially parallel therewith, said carriage further including a roller mounted on an axis substantially parallel with said inclined surface and peripherally engaging said inclined surface and a second roller mounted on an axis substantially parallel with said second surface and peripherally engaging said second surface.

4. In a vehicle having a body, a trackway carried adjacent to the top of a wall of said body, a carriage movably supported solely upon said trackway and providing an upper hinge pivot and a lower hinge pivot aligned therewith, a door swingably supported on said hinge pivots, and anti-friction means on said carriage adjacent the level of said lower hinge pivot engaging said body wall.

5. In a vehicle having a body, a trackway carried adjacent the top of a wall of said body, a carriage movably supported solely upon said trackway and providing an upper hinge pivot and a lower hinge pivot aligned therewith, and a door swingably supported on said hinge pivots, said body wall being provided, at intervals spaced in the direction of extension of said trackway, with open-mouthed sockets curved about axes parallel with the axis of said hinge pivots, and a correspondingly-curved finger carried by said door and projecting from its edge adjacent said wall and engageable, at times, in a selected one of said sockets to hold said carriage against movement along said trackway.

6. In a vehicle having a body, a trackway supported upon a wall of said body adjacent the top of such wall, said trackway providing a surface substantially parallel with said wall and spaced therefrom, a second surface located between said wall and said parallel surface and inclining upwardly and away from said wall, and a downwardly-facing surface located between said wall and said parallel surface, said downwardly-facing surface being provided with a downwardly-opening groove therein, a carriage comprising an upright element positioned adjacent said first-named surface, a roller carried by said upright element upon an axis substantially parallel with said first-named surface and having its periphery in engagement with said first-named surface, an extension on said upright element overhanging said inclined surface, a roller journalled on said extension upon an axis substantially parallel with said inclined surface and having its periphery in engagement with said inclined surface, a substantially horizontal element suspended from said upright element and projecting oppositely therefrom toward and away from said wall, a hanger secured to that arm of said horizontal element projecting toward said wall and extending above and below said horizontal element, the upwardly-extending portion of said hanger being received in said groove and the downwardly-extending portion of said hanger proximately approaching the floor of said body, a hinge pivot carried by the other arm of said horizontal element, a second horizontal element carried near the base of said hanger and projecting away from said wall, a second hinge pivot carried by said second horizontal element and axially aligned with said first-named hinge pivot, and a door swingably suspended on said hinge pivots.

7. The organization of claim 6 in which said trackway extends from end to end of a longitudinal wall of said body, an allochirally-related assemblage is associated with the opposite wall of said body, and means is provided for locking the doors of the two assemblages against swinging movement about their hinge pivots when the doors are swung into substantially perpendicular relation with said walls.

8. In a device of the class described, a trackway presenting a vertical face adapted to be secured to a wall, a downwardly-facing horizontal face provided with a downwardly-opening, longitudinally-extending groove therein, a second vertical face, spaced from said first-named face and oppositely presented relative thereto, and a face inclined upwardly and away from said first-named vertical face toward said second vertical face, and a carriage mounted on said trackway and including a roller engaging and supported by said inclined face, a roller engaging said second vertical face, a portion underlying said horizontal face, and a portion engaged in said groove, said carriage providing aligned hinge means disposed upon a vertical axis adjacent the plane of said second vertical face, for supporting a door.

9. In a vehicle having a body including a substantially vertical wall, a trackway presenting a vertical face, means securing said trackway to said wall adjacent the top thereof with said face engaging said wall, said trackway further presenting a downwardly-facing horizontal face provided with a downwardly-opening, longitudinally-extending groove therein, a second vertical face, spaced from said first-named face and oppositely presented relative thereto and a face inclined upwardly and away from said first-named vertical face toward said second vertical face, and a carriage mounted on said trackway and including a roller engaging and supported by said inclined face, a roller engaging said second vertical face, a portion underlying said horizontal face, and a portion engaged in said groove, said carriage further including a vertical element substantially coextensive with said wall and located substantially in the plane of said wall, horizontal elements adjacent the upper and lower ends of said vertical element, hinge means carried by said horizontal elements upon aligned vertical axes, for supporting a door, and antifriction means carried by said vertical element near the lower end thereof and engaging said wall.

10. In a vehicle having a body, a trackway carried adjacent the top of a wall of said body, a carriage movably supported solely upon said trackway and providing an upper hinge pivot near the top of said wall and a lower hinge pivot near the bottom of said wall and vertically aligned with said upper hinge pivot, and a door swingably supported on said hinge pivots, said body wall being provided, at intervals spaced in the direction of extension of said trackway, with open-mouthed sockets, and a finger fixedly carried by said door and projecting, beyond the common axis of said hinge pivots, from that edge of said door adjacent said wall, said finger being registrable selectively with said sockets and being engageable, at times, in any selected one of said sockets, as said door swings toward perpendicular relation with said wall, to hold said carriage against movement along said trackway.

BARON M. ANGELL.

REFERENCES CITED

The following references are of record in the file of this patent:

UNITED STATES PATENTS

| Number | Name | Date |
| --- | --- | --- |
| 1,816,031 | Willis | July 28, 1931 |
| 2,005,086 | Jones | June 18, 1935 |
| 2,155,463 | Angell | Apr. 25, 1939 |
| 2,220,436 | Ziegler | Nov. 5, 1940 |